United States Patent
Yoakim et al.

(10) Patent No.: US 10,285,533 B2
(45) Date of Patent: May 14, 2019

(54) FOOD PREPARATION SYSTEM (71) Applicant: NESTEC S.A., Vevey (CH)

(72) Inventors: Alfred Yoakim, St-legier-la Chiesaz (CH); Christian Talon, Vufflens-le-Chateau (CH); Jean-Luc Denisart, Cully (CH); Damien Neurohr, Lausanne (CH)

(73) Assignee: Nestec S.A., Vevey (CH)

( * ) Notice: Subject to any disclaimer, the term of this patent is extended or adjusted under 35 U.S.C. 154(b) by 309 days.

(21) Appl. No.: 14/438,701

(22) PCT Filed: Oct. 17, 2013

(86) PCT No.: PCT/EP2013/071798
§ 371 (c)(1),
(2) Date: Apr. 27, 2015

(87) PCT Pub. No.: WO2014/063998
PCT Pub. Date: May 1, 2014

(65) Prior Publication Data
US 2015/0257584 A1    Sep. 17, 2015

(30) Foreign Application Priority Data

Oct. 25, 2012  (EP) .................................... 12189875

(51) Int. Cl.
    A47J 31/44    (2006.01)
(52) U.S. Cl.
    CPC ................................. A47J 31/4403 (2013.01)
(58) Field of Classification Search
    CPC ............... A47J 31/4403; A47J 31/0642; A47J 31/0668; A47J 31/0673; A47J 31/0678; A47J 31/3623; A47J 31/3676
    (Continued)

(56) References Cited

U.S. PATENT DOCUMENTS 4,951,363 A *  8/1990  Takahashi ............... F16L 33/03
                                                        24/20 R
7,322,274 B2    1/2008  Wang
                        (Continued)

FOREIGN PATENT DOCUMENTS

EP       1688072 A1 *  8/2006  .......... A47J 31/0668
JP      2009-504227     2/2009
                        (Continued)

OTHER PUBLICATIONS

Russian office action dated Aug. 22, 2017 for related RU Application No. 2015119455.
(Continued)

*Primary Examiner* — Dana Ross
*Assistant Examiner* — Kuangyue Chen
(74) *Attorney, Agent, or Firm* — K&L Gates LLP (57) ABSTRACT

The present invention is directed to a food preparation machine (1) for preparing a food product by mixing a fluid with an ingredient, said machine comprising: i. a base (2) having a fluid reservoir (3) and a pump able to withdraw said fluid through fluid-conducting pipes, said base optionally comprising an element suitable for heating and/or chilling said fluid, ii. a brewing unit (3) comprising connecting means (6, 7, 8) for connecting fluidly to said fluid-conducting pipes of said base (2), and further comprising fluid injection means and at least two cavity parts (10, 11) able to assemble to create a closed cavity for enclosing said ingredient, such that said brewing unit (3) can inject fluid through said ingredient under pressure for mixing with said ingredient, characterized in that said brewing unit (3) is fully detachable from said base (2), and comprises locking means (22, 23, 24) suitable for preventing disassembly of the cavity parts (10, 11) when fluid pressure within said cavity and/or said ingredient exceeds atmospheric pressure.

12 Claims, 8 Drawing Sheets (58) Field of Classification Search
USPC .............................. 99/287, 295, 302 R, 323
See application file for complete search history.

(56) References Cited

U.S. PATENT DOCUMENTS

| | | | | |
|---|---|---|---|---|
| 2008/0302249 | A1* | 12/2008 | Lin ..................... | A47J 31/3666 |
| | | | | 99/289 R |
| 2010/0018405 | A1* | 1/2010 | Duvall ................... | A47J 31/22 |
| | | | | 99/289 R |
| 2010/0239734 | A1* | 9/2010 | Yoakim .................. | A47J 31/22 |
| | | | | 426/433 |
| 2010/0275787 | A1* | 11/2010 | Bonacci .............. | A47J 31/3676 |
| | | | | 99/295 |
| 2011/0162533 | A1* | 7/2011 | Fumagalli ........... | A47J 31/0668 |
| | | | | 99/295 |
| 2011/0223302 | A1* | 9/2011 | Star ........................ | A23L 2/39 |
| | | | | 426/425 |
| 2011/0309616 | A1* | 12/2011 | Mager ................. | F16L 33/2071 |
| | | | | 285/382.7 |
| 2014/0109772 | A1 | 4/2014 | Denisart et al. | |

FOREIGN PATENT DOCUMENTS

| | | | | |
|---|---|---|---|---|
| WO | | 97/43937 | 11/1997 | |
| WO | | 9743937 | 11/1997 | |
| WO | WO 2005079638 | A1 * | 9/2005 | .......... A47J 31/0673 |
| WO | WO 2012104173 | A1 * | 8/2012 | .......... A47J 31/0668 |

OTHER PUBLICATIONS

Japanese office action dated Aug. 8, 2017 for related JP Application No. P2015-538387.

* cited by examiner

FOOD PREPARATION SYSTEM

CROSS REFERENCE TO RELATED APPLICATIONS

The present application is a National Stage of International Application No. PCT/EP2013/071798, filed on Oct. 17, 2013, which claims priority to European Patent Application No. 12189875.3, filed on Oct. 25, 2012, the entire contents of which are being incorporated herein by reference.

FIELD OF THE INVENTION

The present invention concerns a food preparation system, preferably a beverage preparation system, comprising a detachable portable brewing unit.

BACKGROUND OF THE INVENTION

Food preparation systems are well known in the food science and consumer goods area. Such systems allow a consumer to prepare at home a given type of food, for instance a beverage such as a coffee-based beverage, e.g. an espresso or a brew-like coffee cup.

In the following description, the invention will described in relation to a its specific application to beverage preparation systems. However, the invention globally encompasses systems for non-beverage items preparation, such as for instance ice cream, soups comprising particles (herbs, croutons, etc.), jellies, dairy items (e.g. yogurts, cream desserts, etc.), or any kind of similar non liquid flowable edible products.

Today, most preparation systems for in-home food and beverage preparation comprise a machine having a so-called "brewing chamber" or "brewing unit" which can accommodate portioned ingredient for the preparation of the food or beverage. A so-called "brewing unit" comprises several parts which are designed to be assembled so as to create a closed cavity wherein the food or beverage ingredient can be placed. The brewing unit comprises means for injecting a preparation medium under pressure such as a fluid which is typically water through the ingredient, so as to prepare a corresponding food or beverage, which is then dispensed out of the brewing unit, to the consumer. The preparation fluid is sourced from a fluid conducting system of the machine to which the brewing unit is connected. The preparation is performed within the brewing unit at a pressure above the atmospheric pressure, which is typically comprised between 1 and 20 bar, preferably between 2 and 15 bar (relative pressure). The preparation can be performed by passing preparation fluid through the ingredient in a loose form or through the ingredient contained in a capsule or pod. For this reason, it is an essential characteristic of a brewing unit to be able to withstand a pressure difference between inside the cavity, and the ambient pressure (which is generally equal or substantially equivalent to atmospheric pressure) without opening itself when pressure inside the cavity increases (typically fluid pressure, e.g. water pressure).

Ingredient portions can be pre-dosed before they are placed into the cavity of the brewing unit, and can take the form of soft pods or pads, or sachets. More and more systems utilize semi-rigid or rigid portions such as rigid pods or capsules. In the following, it will be considered that the beverage machine of the invention is a beverage preparation machine working with a rigid or semi-rigid capsule, or with an ingredient in loose form such as roast and ground coffee grains, to be placed directly into the brewing unit of the machine.

As said above, the so-called "brewing unit" of a machine comprises a receptacle or cavity for accommodating said ingredient, that is for instance contained in a capsule, and a fluid injection system for injecting a fluid, preferably water, under pressure through said ingredient, for instance by piercing through a wall of the capsule that contains the ingredient. Water injected under pressure through the ingredient, for the preparation of a coffee beverage according to the present invention, is preferably hot, that is to say at a temperature above 70° C. However, in some particular instances, it might also be at ambient temperature, or even chilled. The pressure inside the brewing unit during extraction and/or dissolution of the ingredient is typically about 1 to about 8 bar for dissolution products and about 2 to about 12 bar for extraction of roast and ground coffee.

By definition, the brewing unit comprises means to conduct fluid through the ingredient (e.g. fluid injection means such as for instance a needle), and a "closed cavity", that is to say a cavity that holds the ingredient within said brewing unit, such that said ingredient is not displaced out of said cavity under the effect of fluid passing there through, during the whole food or beverage preparation cycle, and until said ingredient is extracted or dissolved as a final food or beverage that is to be delivered to the consumer through a dispensing opening of said brewing unit. Preferably also, the so-called "closed" cavity of the brewing unit should ensure that no fluid injected therein escapes said brewing unit, except of course as final food or beverage that is to be delivered to the consumer.

In other words, a "brewing unit" comprises all functional elements necessary for holding the ingredient—be it loose, or contained in a capsule or pod—, and directing preparation fluid through and mixing it with said ingredient, during the preparation process and until final product delivery to the consumer. At all steps, the brewing unit resists the pressure difference between inside and outside of its cavity, such that:
 fluid can only flow from its entry point into the cavity, through the ingredient, towards the beverage dispensing opening of the cavity,
 and in case the ingredient is contained in a capsule or pod, the brewing unit encloses said capsule or pod so as to guarantee that fluid pressure increase therein does not damage the walls of said capsule or pod.

In food and beverage preparation systems known today, the brewing unit is built-in with the machine. In some cases, for instance in some beverage preparation systems that function with capsules, one part of the whole brewing unit is detachable, which is often referred to as a "capsule holder". However such capsule holders do not contain the ingredient completely. Such elements of a brewing unit which are detachable from the main machine base are convenient for the consumer because they provide a possibility to easily place the ingredient with said brewing unit.

Finally, in some known beverage preparation systems, a part of the brewing unit also contains fluid injection means for injecting fluid under pressure through the ingredient, for instance by injecting water under pressure within a closed capsule within which the ingredient is enclosed. Such a system is described for instance in European patent EP 1 688 072 B1, which strictly speaking, cannot be considered as a whole brewing unit, because although it encloses the ingredient (which is contained in a capsule), and also comprises the injection means for injecting the preparation fluid through said ingredient, it does not enclose the ingredient capsule sufficiently to guarantee that said capsule can resist an increase of pressure. In order to completely enclose the capsule, the system disclosed in EP 1688 072 B1 further comprises a plate that is part of the machine and cooperates with the detachable capsule holder to completely enclose the capsule when fluid is injected through the ingredient under pressure.

The detachable capsule holder disclosed in this patent is disadvantageous in that when it is disconnected from the main machine base, residual pressure within the ingredient (i.e. within the capsule that contains the ingredient) can push the two parts in the open configuration, and the remaining fluid can flow back and be spilled outside of the capsule. Unwanted opening of the brewing unit under the effect of internal pressure, leading to backflow and spillage, are of course undesirable for security reasons (in particular if the fluid is hot water), and obvious cleanliness reasons.

The PCT application WO 97/43937 discloses an adaptor for a pre-packaged coffee dose. The adaptor comprises two parts hinged to one another: a coffee dose holder, and a lid able to pivot around the hinge to close the dose holder. It further comprises a handle to place the adaptor onto a coffee machine. The holder and lid disclosed in this document can be conveniently fastened or unfastened by using the same hand that holds the whole adaptor. More precisely, this is performed by using a so-called "lid operating means", which comprises a lock-pin of the lid that fits into a hollow of the coffee holder handle, jutting out laterally so as to allow operation of the lid by a finger of the same hand that holds the device.

The US patent application US 2011/0162533 discloses a coffee holding arm of a hand loading electric coffee machine. It comprises a lever, a container for holding a capsule, a capsule perforation device that is pivotally attached to the container such that when closed onto the latter, it pierces the capsule to allow coffee preparation. The attachment means for attaching the coffee holding arm to the coffee machine are placed on the container, such that when said coffee holding arm is secured functionally to the machine, the perforating device is located between the machine and the container and as a result the container and the perforating device cannot be disassembled.

It is therefore an objective of the present invention to provide a food or beverage preparation system comprising a fully detachable brewing unit able to obviate disadvantages of the known systems, and which can be cleaned completely separately from the rest of the machine.

SUMMARY OF THE INVENTION

The main objective set out above is met with a food preparation machine for preparing a food product by mixing a fluid with an ingredient, said machine comprising:
- a base having a fluid reservoir and a pump able to withdraw said fluid through fluid-conducting pipes, said base optionally comprising an element suitable for heating and/or chilling said fluid,
- a brewing unit comprising connecting means for connecting fluidly to said fluid-conducting pipes of said base, and further comprising fluid injection means and at least two cavity parts able to assemble to create a closed cavity for enclosing said ingredient, such that said brewing unit can inject fluid through said ingredient under pressure for mixing with said ingredient, characterized in that said brewing unit is fully detachable from said base, and comprises locking means suitable for preventing disassembly of the cavity parts and for keeping the cavity closed (i.e. for preventing at least partial separation of the two cavity parts) when—even though—fluid pressure within said cavity and/or said ingredient exceeds ambient pressure.

In most instances, "ambient pressure" corresponds to the atmospheric pressure.

With a brewing unit which comprises locking means as described and claimed, the cavity is secured in a closed position when said brewing unit is detached from the main machine base, whatever the internal pressure within said cavity. As a result, it is possible to detach the brewing unit from the machine base, even if residual pressure remains within the brewing unit cavity after the machine has been used. This provides a safety feature for the consumer, by preventing sudden and unexpected opening of the brewing unit if the latter is detached from the machine base at the time residual pressure still remains therein. Importantly, this also provides a cleanliness advantage in that the brewing unit can be open after usage only at the time it is detached by the user from the machine base and the locking means are unlocked voluntarily by the user. This provides an opportunity to unlock the brewing unit when the latter is placed above a litter, where it the user can then empty the brewing unit cavity from its used contents. The emptying operation of the brewing unit is therefore clean and safe.

In one embodiment of the invention, the connecting means are part of one only of said cavity parts, such that the other cavity part is movable independently and detachable from the rest of the machine, when the other cavity part of the brewing unit is functionally connected to the base. In such a configuration, the latter cavity part is free to move relative to the machine base, for instance it can move open relative to the other cavity parts of the brewing unit. Further, it can be fully detached from the other cavity part that is still functionally linked to the machine base. This possibility can be used for instance if the user wants to perform a non-standard operation, such as for instance dispensing hot water from the cavity part that is fluidly connected to the machine base. In that case, the cavity part of the brewing unit that comprises the connecting means, stays connected to the main machine base, and the other cavity part (e.g. which is placed below the connected part) is removed, such that the machine can deliver fluid, which will be dispensed directly below the connected cavity part, and not into a closed cavity of the brewing unit. Such a non-standard mode can be convenient in occasional usage such as for instance maintenance or descaling cycles of the machine.

In a preferred embodiment of the invention, the ingredient is contained in a closed capsule, in an open capsule, or in a pod.

Advantageously, the cavity parts can be hingedly connected to one another, so as to be assembled/disassembled by pivoting around a hinge.

In a first embodiment of the invention, the locking means can comprise a bayonet mechanism with hooks or grooves in one cavity part that cooperate with corresponding bayonet pins of the other cavity part. In that case, said bayonet mechanism is preferably lockable by rotating one cavity part relative to the other.

In a second embodiment, the locking means can comprise a magnetic lock with at least one magnet 27 in a first cavity part, and at least one corresponding metallic element 28 in the other cavity part.

In a third alternative embodiment, the locking means comprises a knee lever closing mechanism comprising an upper 29 and a lower 30 rod connected by an axle 31, said axle 31 being eccentric.

In a fourth possible embodiment, the locking means can comprise protrusions 32, 33 of the cavity parts, that mate when said cavity parts are assembled in the closed configuration of said brewing unit, so as to form an axle, along which a ring 34 is slidably mounted, one of said protrusions being shorter 32 than the other 33 such that said ring 34 is movable between:

i. a first position wherein it gathers both protrusions 32, 33 so as to lock said brewing unit in the closed configuration, and ii. a second position wherein said ring 34 frees one of the protrusions 32 so as to unlock said brewing unit.

In any case, the locking means can be separate from, or at least partially built-in with said connecting means.

In a most preferred embodiment of the invention, the brewing unit comprises sealing means for preventing fluid leakage outside of said unit when the cavity parts are assembled and locked together.

Preferably, said sealing means comprise an O-ring 35 located at the interface between cavity parts of the brewing unit.

In a particular embodiment of the invention, the connecting means comprise a cone-shaped bore of the brewing unit, and a flexible hosepipe of the base, the outside diameter of which is comprised between the greater and smaller inner diameter of the cone-shaped bore such that the tip of said hosepipe can be fitted and pressed into said bore in a leaktight manner.

Most preferably, the brewing unit is water and detergent resistant, and washable in a dishwasher at a temperature comprised between 15° C. and 85° C., preferably between 18° C. and 70° C., and is made of: polyethylene (PE), polypropylene (PP), polystyrene (PS), polycarbonate (PC), metal, alloy, natural or synthetic rubber, or a combination thereof.

BRIEF DESCRIPTION OF THE DRAWINGS

Additional features and advantages of the present invention are described in, and will be apparent from, the description of the presently exemplary embodiments which are set out below with reference to the drawings in which.

DETAILED DESCRIPTION OF THE INVENTION

In the following, an exemplary embodiment of the invention will be described, which is a preparation machine for beverages.

Figure 1:
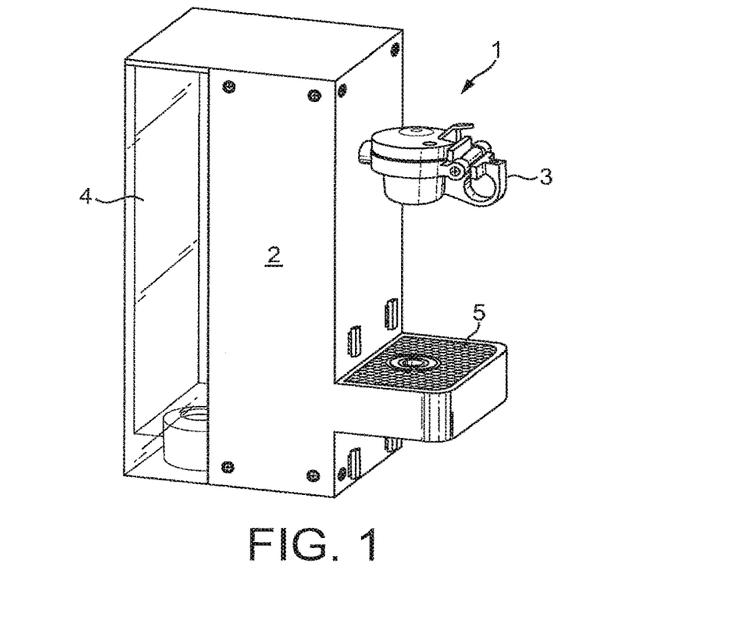
FIG. 1 is a schematic perspective view of a beverage system according to the invention.

As illustrated in FIG. 1, the beverage preparation machine 1 comprises a main machine base 2, a detachable brewing unit 3, and an ingredient capsule (not shown in FIG. 1). The capsule is a closed capsule, made for instance of a thermoplastic, a metal, paper, or a combination thereof.

The general principle of extracting and/or dissolving the contents of a closed capsule under pressure is known, and consists typically of inserting the capsule in the brewing cavity of a machine, injecting a quantity of pressurized water into the capsule, generally after piercing a face of the capsule with a piercing injection element such as a fluid injection needle which is associated to the brewing unit of the machine, so as to create a pressurized environment inside the capsule either to extract the substance or dissolve it, and then release the extracted substance or the dissolved substance through the capsule. When fluid is injected in the capsule compartment, a pressure is built up, which serves as an extraction means for extracting and/or dissolving ingredients contained inside the capsule. Such ingredients can be for instance a bed of roast and ground coffee. Alternatively or in combination with roast and ground coffee, the ingredients can comprise soluble ingredients, such as for instance beverage premixes. Capsules allowing the application of this principle are described for example in European patents no EP 1472156 B1, and EP 1784344 B1. By "pressurized" water, it is meant water (or an equivalent extraction fluid) which is pumped from a reservoir of the machine, i.e. at a pressure above ambient—which is generally equivalent to atmospheric—pressure. For beverage preparation, such as extraction of roast and ground coffee, dissolution of soluble ingredients (coffee, tea, chocolate, etc.), or infusion of infusible material such as tea leaves, the functional pressure is generally comprised between 1 and 20 bar (relative pressure to atmospheric pressure), preferably between 2 and 15 bar.

The machine base 2 comprises a fluid reservoir 4—in most cases this fluid is water—for storing the fluid that is used to dissolve and/or infuse and/or extract under pressure the ingredient(s) contained in the capsule. The machine comprises a heating element such as a boiler or a heat exchanger, which is able to warm up the water used therein to working temperatures (classically temperatures up to 80-90° C.). Finally, the machine comprises a pump element 25 for circulating the water from the tank to the capsule, optionally though the heating element. The way the water circulates within the machine is e.g. selected via a selecting valve means, such as for instance a peristaltic valve of the type described in European patent EP 2162653 B1.

The machine base 2 comprises fluid-conducting pipes 26 for conducting the fluid from the reservoir to the brewing unit and the ingredient contained therein. The fluid-conducting pipes 26 comprise connecting means, which serve to releasably assemble the brewing unit to said base 2, through corresponding connecting means of the brewing unit 3. The connection between the base 2 and the brewing unit 3 is a leaktight fluid connection. It can also comprise data connection 37, 38. The data connection 37, 38 between the base 2 and the brewing unit 3 can be performed by contact between the two (e.g. by electrical contact), or alternatively, it can be contactless (e.g. WIFI, RFID, GSM, Bluetooth, or equivalent contactless data transmission standards). The advantage of contactless connectivity between the machine base 2 and the brewing unit 3, is that the data transfer between the two is not impacted by the cleanliness of the physical elements of the system: in case one of several of the elements of the beverage system are dirty (e.g. spillage of liquid, water, ingredient, or product onto some parts of the machine base or the brewing unit), the quality of the data transmission between the two does not decrease, or is not stopped.

The machine base 2 is constructed such that the connecting means between said base 2 and the detachable brewing unit 3 are easily accessible to the consumer, preferably in the front side of the machine. The latter further comprises a cup holder 5, which is preferably movable so that it can adapt in height to different cup sizes. The cup holder 5 is placed below the brewing unit 3.

Figure 2:
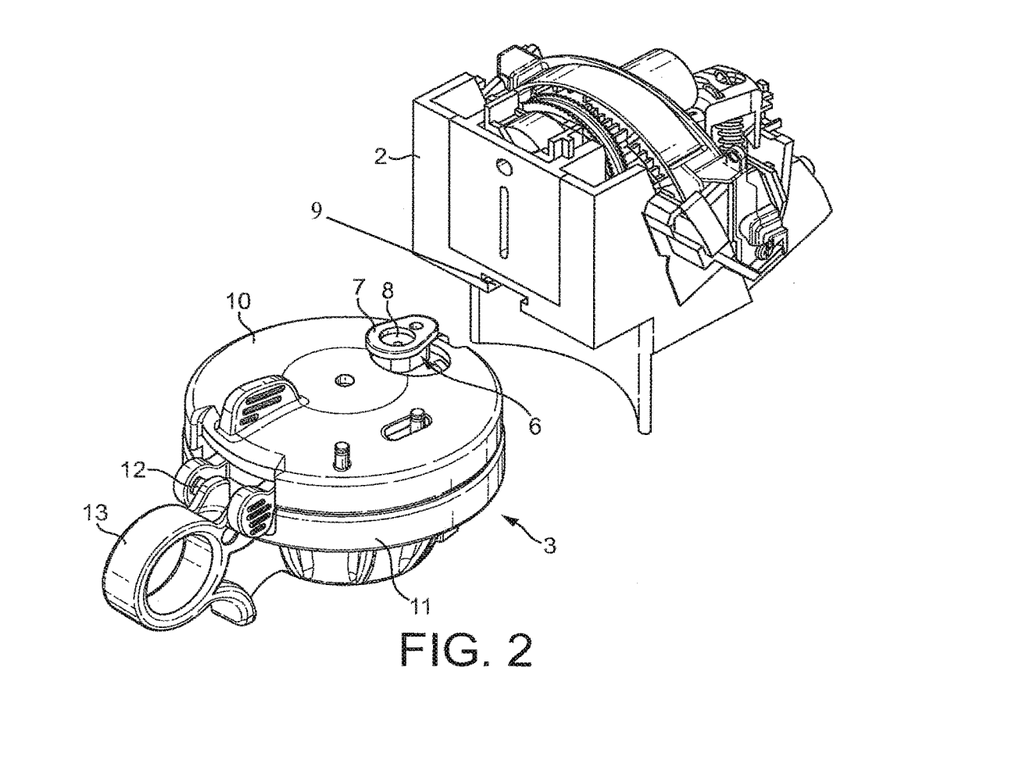
FIG. 2 is a schematic perspective partial cut view of a detached brewing unit and the connection portion of the machine base.

In the embodiment shown in FIG. 2, the connecting means of the brewing unit 3 comprise a protrusion 6, that extends preferably vertically from the top surface of the brewing unit, and having a distal edge 7 extending outwardly, preferably 30 horizontally, from the top of said protrusion 6. The protrusion contains a central channel 8 that extends from the upper surface of the distal edge 7, into the cavity of the brewing unit 3, and is therefore able to conduct the beverage preparation fluid from the machine base 2, towards the interior of the brewing unit, when the latter is functionally connected to the base 2. On the outside, the shape of the fluid conducting channel 8 is 5 that of a cone, with its largest diameter turned outwardly, as illustrated in FIG. 2. That cone-shaped bore of the brewing unit is meant to mate with a flexible hosepipe 36 of the machine base, said hosepipe 36 being part of the fluid conducting channel system that conducts the fluid contained in the reservoir 4 through the base 2, towards the brewing unit. The outside diameter of the flexible hosepipe 36 is comprised between the greater 10 and smaller inner diameter of the cone-shaped bore, such that when the brewing unit is connected functionally to the machine base, the tip of said hosepipe 36 fits and is pressed into said bore in a leaktight manner (not represented in the drawing). Also as shown in FIG. 2, the connecting means of the machine base 2 comprise a T-shaped groove 9 that extends substantially horizontally from the front wall of the machine base 2, 15 inwardly inside said base. The shape and dimensions of the T-shaped groove 9 are such that they allow the edge 7 of the brewing unit to slide thereinto.

As illustrated in FIG. 2, the brewing unit comprises two parts able to assemble to create a closed cavity for enclosing said ingredient, such that said brewing unit can inject fluid through said ingredient under pressure for mixing with said ingredient. More precisely in the embodiment illustrated in FIG. 2 or 3, the brewing unit 3 comprises an upper cavity part 10 and a lower cavity part 11. Both cavity parts 10, 11, are hinged to one another via a pivot hinge 12. The lower cavity part 11 comprises a handle 13 for handling the brewing unit, in particular to facilitate insertion and removal into/from the machine base 2. The connecting means of the brewing unit—i.e. the protrusion 6 and the distal end 7—are part of the upper cavity part 10, and more particularly, the protrusion 6 extends upwardly from the upper surface of said upper part 10.

Figure 3:
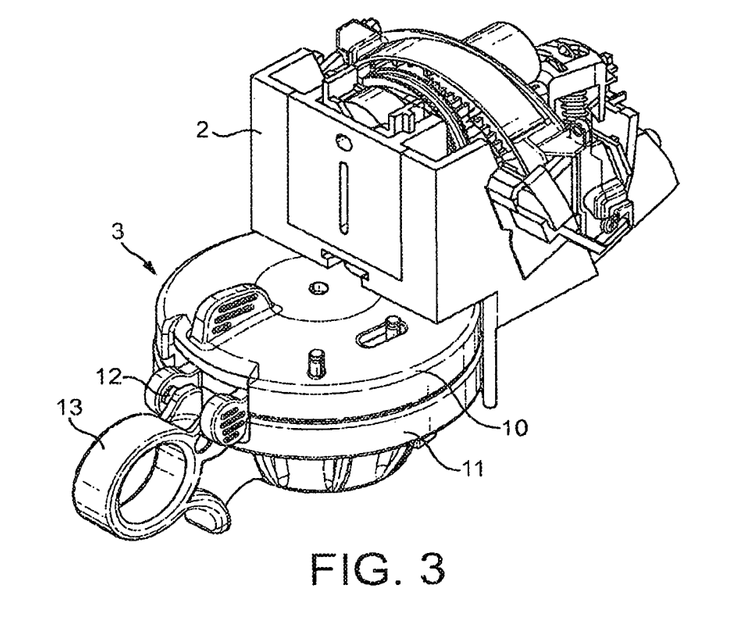
FIG. 3 is a view similar to FIG. 2, with the brewing unit connected to the machine base.

The detachable lockable brewing unit 3 is inserted functionally into the machine base 2 as shown in FIG. 3, by sliding the distal end 7 into the T-shaped groove 9 of the base. In that configuration, the upper cavity part 10 is assembled and integral with the machine base 2, but the lower cavity part 11 is independent from said base 2. As a result, in that configuration where the brewing unit is functionally connected to the base, the lower cavity part 11 is free to move relative to the upper cavity part 10 and relative to the base 2. This possibility is interesting as the brewing unit can be dismounted by separating completely the lower cavity part 11, while the upper cavity part 10 is still functionally attached to the base. This configuration can be required in some occasional cases such as for instance maintenance of the machine or to perform a descaling cycle. In that occasional cases, the lower cavity part can be separated from the upper cavity part by opening the brewing unit completely in the widest open configuration around the hinge 12, and pulling out the lower cavity part from the rest of the brewing unit. This is made possible by providing the groove into which the pivot hinge pivots, with a pathway through which the pivot of said hinge can be slid out.

Figure 4:
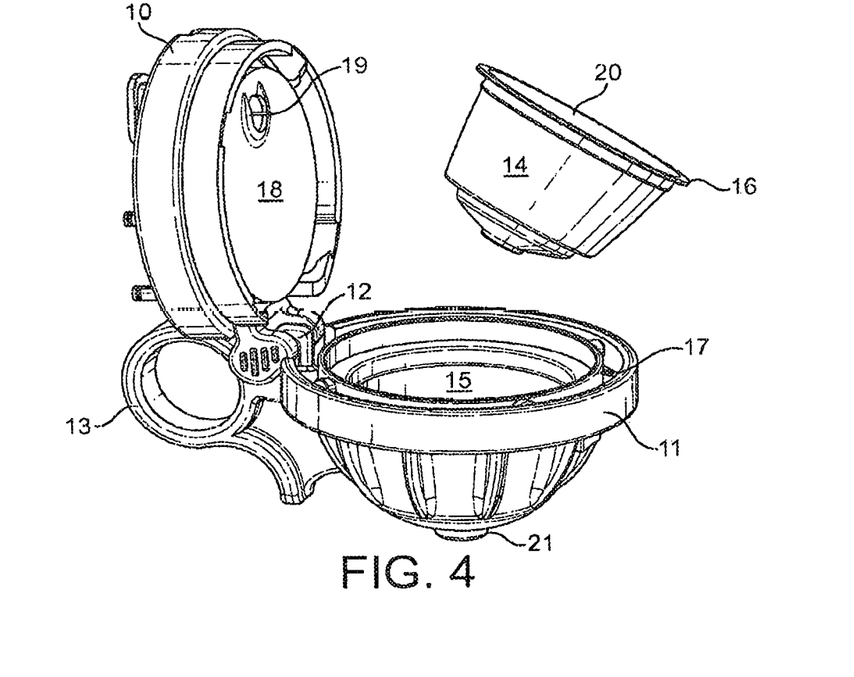
FIG. 4 is a schematic perspective view of a detachable brewing unit per the invention, in its open configuration, during insertion of an ingredient capsule therein.

As illustrated in FIG. 4, the brewing unit 3 comprises a receptacle or cavity for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand. More precisely, FIG. 4 shows the brewing unit in its open configuration, i.e. when its lower cavity part 11 and upper cavity part 10 are disassembled from one another by pivoting around the pivot hinge 12. By "disassembled" it is meant that lower and upper cavity part are partially split from one another, as illustrated in FIG. 4. In this open configuration of the brewing unit 3, an ingredient, or an ingredient capsule 14 as represented in FIG. 4 can be inserted inside the brewing unit cavity, or removed therefrom after usage. The capsule is inserted in a complementary hollow cup-shaped cavity 15 of the lower brewing part 11, such that an upper edge 16 of the capsule 14 rests upon a flange 17 surrounding the cavity 15. The upper cavity part 10 comprises a lower surface made of a disc 18 of rubber material, said disc being pierced through by the fluid conducting channel 8 described hereinbefore. More precisely, on the lower surface of the disc, the channel is made of a solid needle 19 which is able to pierce through thin film material such as the top membrane 20 of the closed capsule so as to inject fluid thereinto. When the brewing unit 3 is closed, the edge 16 of the capsule is sandwiched between the flange 17 and the rubber disc 18, so that a sealing is performed in this area and water circulating from the needle 19 towards the capsule, cannot escape from the space in between the top membrane 20 of the capsule and outside of the brewing unit, i.e. the water flow is forced from the needle 19 through the interior of the capsule 14 where it produces a beverage, and then towards the dispensing side of the capsule and throughout the dispensing opening 21 of the brewing unit.

According to the invention, the brewing unit comprises locking means for preventing disassembly of the cavity parts when fluid pressure within said cavity and/or said ingredient exceeds atmospheric pressure. An exemplary embodiment of the locking means will now be described with reference to FIGS. 5 to 7.

Figure 5:
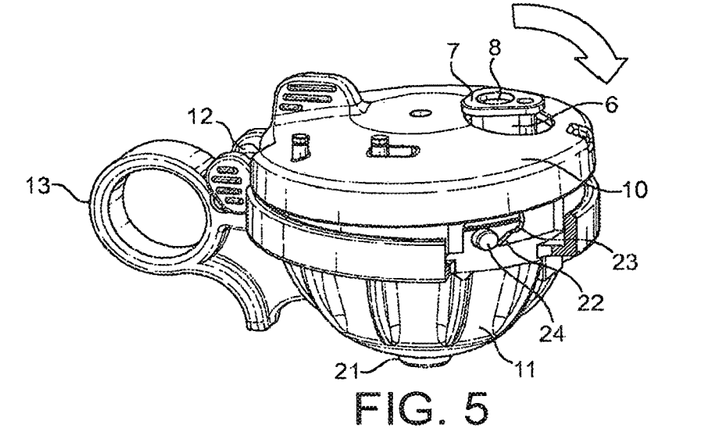
FIG. 5 is a view similar to FIG. 4, the capsule being inserted within the brewing unit cavity, during closing of said brewing unit.

As shown in FIG. 5, the locking means comprise a bayonet mechanism with hook 22 and groove 23 located in one cavity part, that cooperate with corresponding bayonet pin 24 of the other cavity part. The bayonet mechanism is therefore lockable by rotating one cavity part relative to the other. More precisely, as shown in FIG. 5, the hook 22 and groove 23 are part of a portion of the upper cavity part 10 which is attached to, but rotationally movable relative to the main portion of said upper cavity part which is linked to the hinge 12 and comprises the connecting means (i.e. protrusion 6 and distal edge 7) and the fluid conducting channel 8. The bayonet pin 24 is part of the lower cavity part 11.

In the unlock position of the brewing unit illustrated in FIG. 5, the bayonet pin 24 escapes from the hook and groove, so that the upper and lower cavity parts can be disassembled by pivoting around the hinge 12.

Figure 6:
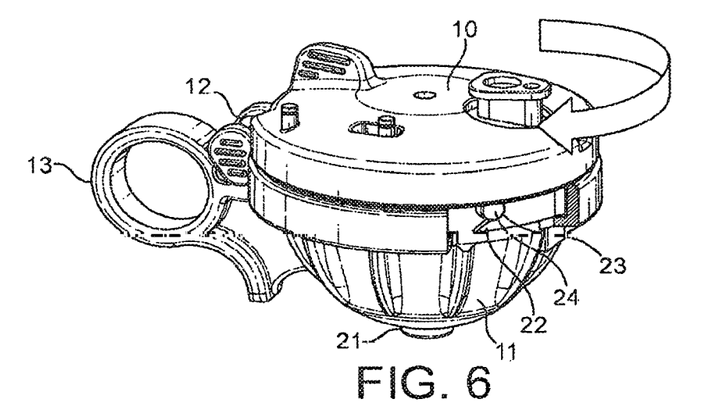
FIG. 6 is a view similar to FIG. 5 during locking of the brewing unit by application of a rotation of the upper cavity part relative to the lower one.
Figure 7:
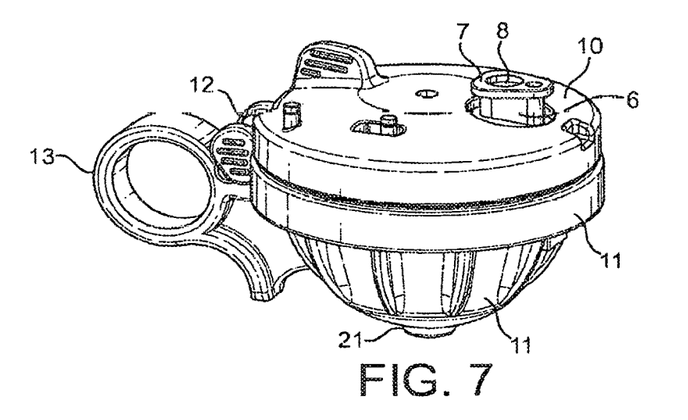
FIG. 7 is a view similar to FIG. 6 showing the same detachable brewing unit in its closed and locked configuration.
Figure 8:
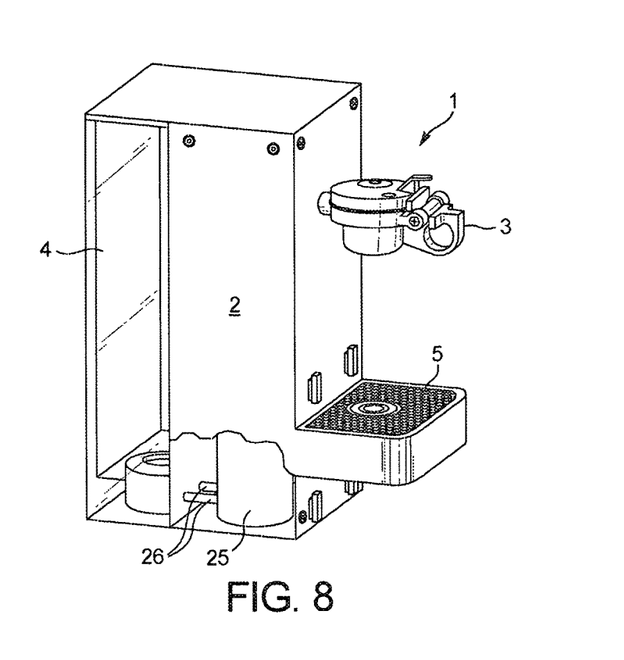
FIG. 8 is a schematic perspective view of a beverage system according to the invention.
Figure 9:
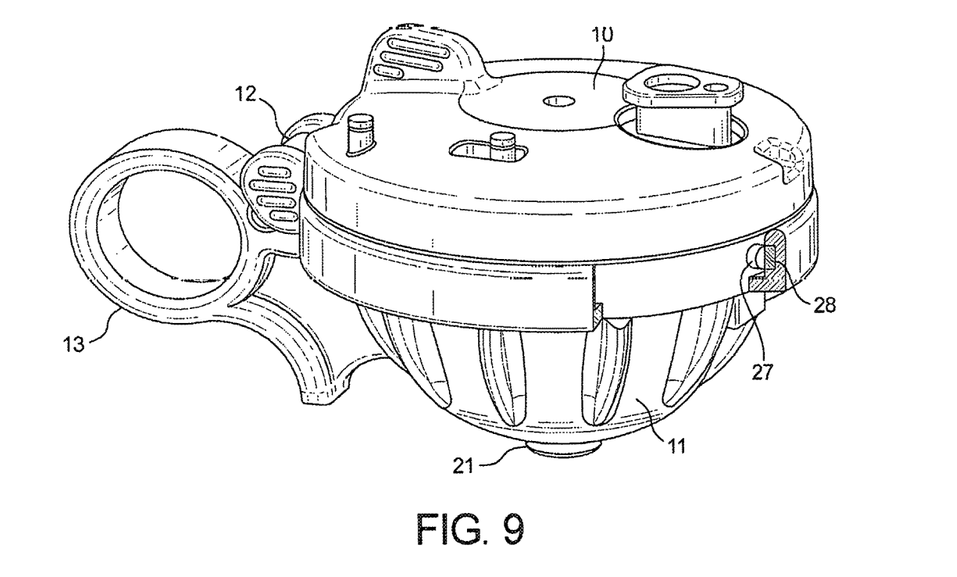
FIG. 9 is a view similar to FIG. 6 during locking of the brewing unit.
Figure 10:
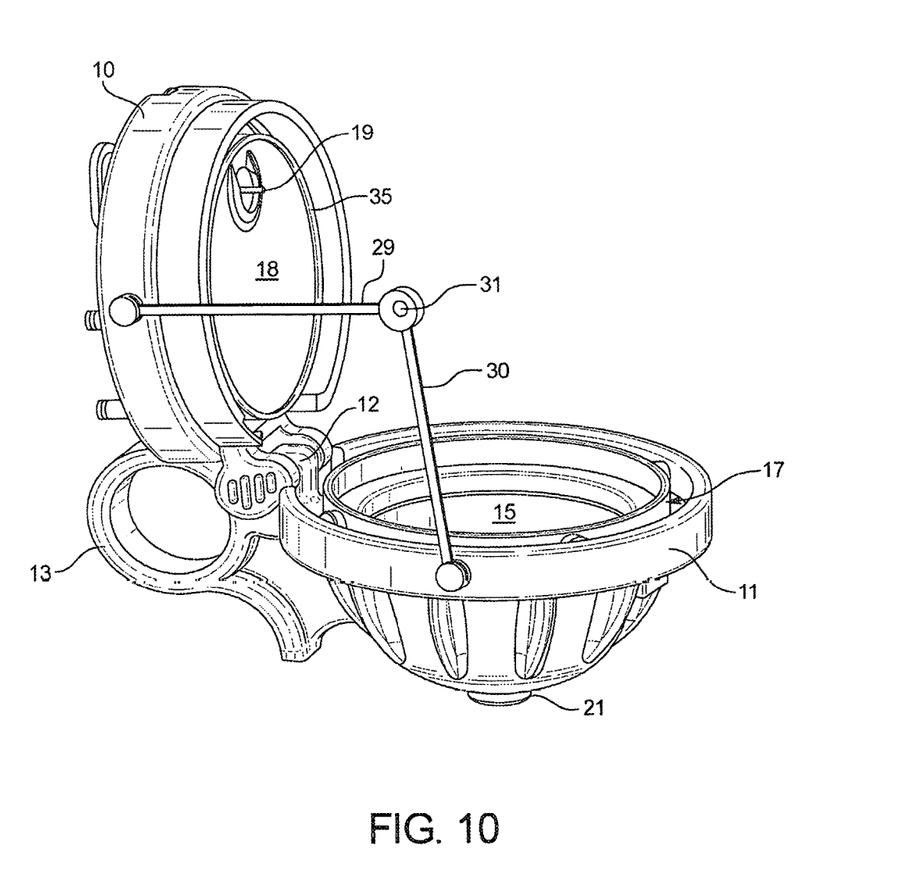
FIG. 10 is a view similar to FIG. 5, the capsule being inserted within the brewing unit cavity, during closing of said brewing unit.
Figure 11:
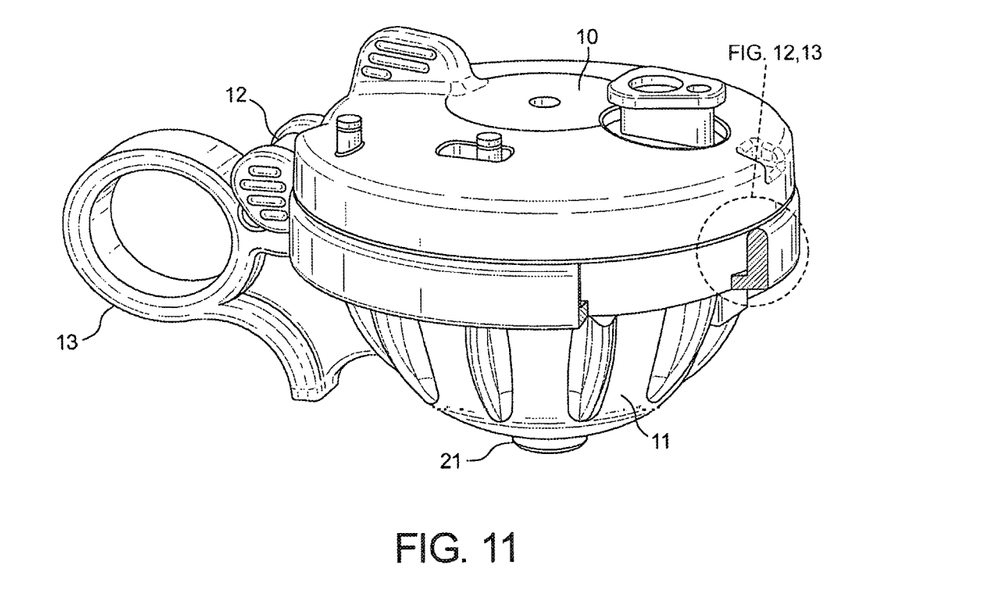
FIG. 11 is a view similar to FIG. 6 during locking of the brewing unit.
Figure 12:
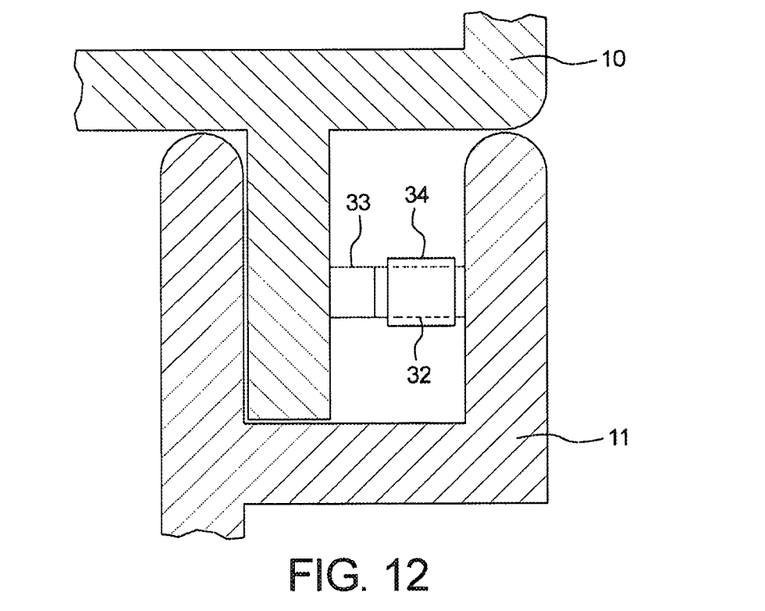
FIG. 12 is a zoomed in view similar to FIG. 6 during locking of the brewing unit.
Figure 13:
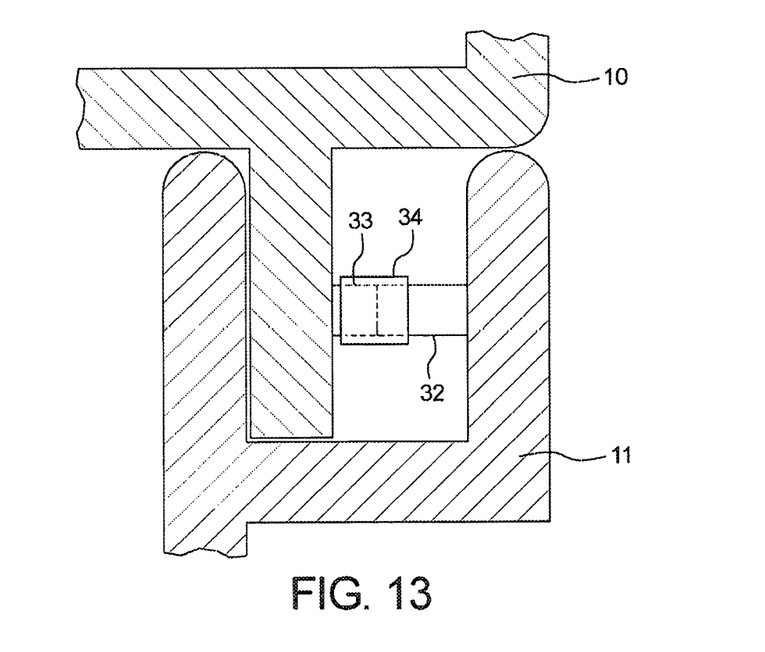
FIG. 13 is a zoomed in view similar to FIG. 6 during locking of the brewing unit.
Figure 14:
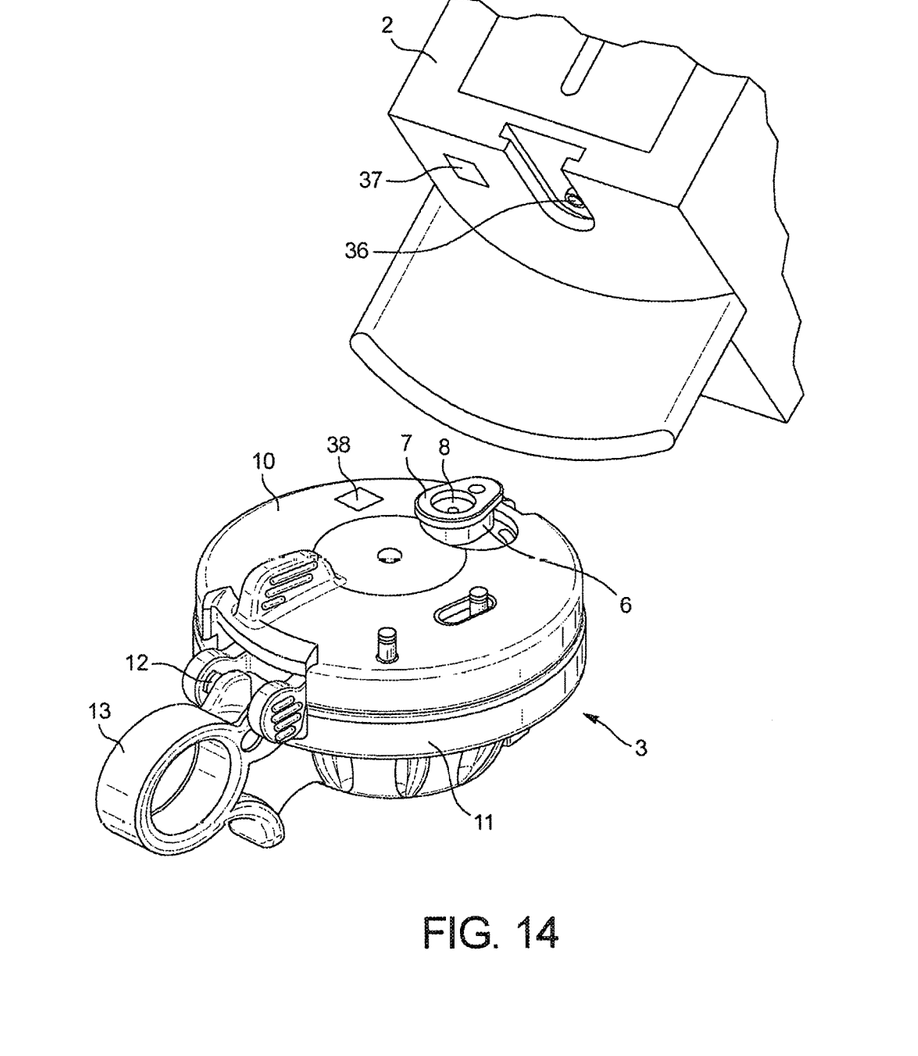
FIG. 14 is a perspective partial cut view of a detached brewing unit and the connection portion of the machine base.

As illustrated in FIG. 6, the brewing unit 3 is locked in the closed position by rotating the upper cavity part 10 relative to the lower cavity part 11, so that the bayonet pin 24 engages into the hook 22 and groove 23. The rotation movement is indicated by an arrow in the drawing. In that locked position, the brewing unit is able to resist an internal pressure directed to open said unit by separating both cavities, that is higher than the pressure outside of said unit. Such a pressure is usually comprised between 1 and 20 bar for food or beverage preparation. It could however be higher than 20 bar for preparation of some particular ingredients. FIG. 7 illustrates a brewing unit according to the invention in the closed and locked position, ready for being functionally connected to the machine base.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

The invention claimed is:

1. A food preparation machine for preparing a food product by mixing a fluid with an ingredient, the food preparation machine comprising:
   a base having a fluid reservoir and a pump able to withdraw the fluid through fluid-conducting pipes; and
   a brewing unit comprising a connecting member for connecting fluidly to the fluid-conducting pipes of the base, the brewing unit further comprising a fluid injection member and at least two cavity parts, the at least two cavity parts comprising a first cavity part and a second cavity part, the at least two cavity parts able to assemble to create a closed cavity for enclosing the ingredient, such that the brewing unit can inject the fluid through the ingredient under pressure for mixing with the ingredient,
   the brewing unit is fully detachable from the base and comprises a locking member suitable for preventing disassembly of the at least two cavity parts and keeping the closed cavity closed, when fluid pressure within the closed cavity and/or the ingredient exceeds atmospheric pressure, the fluid pressure within the closed cavity and/or the ingredient is between 2 bar and 15 bar, and
   the locking member is selected from the group consisting of (i) a bayonet mechanism with at least one member selected from the group consisting of hooks and grooves in one cavity part that cooperate with corresponding bayonet pins of the other cavity part, (ii) a magnetic lock with at least one magnet in the first cavity part and at least one corresponding metallic element in the second cavity part, (iii) a knee lever closing mechanism comprising an upper and a lower rod connected by an axle, and (iv) protrusions of the at least two cavity parts that mate when the at least two cavity parts are assembled in a closed configuration of the brewing unit to form an axle, along which a ring is slidably mounted, one of the protrusions being shorter than the other; wherein the connecting member comprises a protruding member extending vertically from a top surface of the brewing unit, having a distal edge extending outwardly and configured to slide into a groove in the base providing the pressurized fluid source, and containing a central channel that extends from the distal edge into the closed cavity of the brewing unit.

2. The food preparation machine according to claim 1, wherein the connecting member is part of only the first cavity part, such that the second cavity part is movable independently and detachable from the rest of the food preparation machine, when the first cavity part of the brewing unit is functionally connected to the base.

3. The food preparation machine according to claim 1, wherein the ingredient is contained in a closed capsule, in an open capsule, or in a pod.

4. The food preparation machine according to claim 1, wherein the at least two cavity parts are hingedly connected to one another, so as to be assembled/disassembled by pivoting around a hinge.

5. The food preparation machine according to claim 1, wherein the locking member is the bayonet mechanism with at least one member selected from the group consisting of hooks and grooves in one cavity part that cooperate with corresponding bayonet pins of the other cavity part, and the bayonet mechanism is lockable by rotating the one cavity part relative to the other.

6. The food preparation machine according to claim 1, wherein the locking member comprises the protrusions of the at least two cavity parts, and the ring is movable between:
   a first position wherein the ring gathers the protrusions to lock the brewing unit in the closed configuration, and
   a second position wherein the ring frees one of the protrusions to unlock the brewing unit.

7. The food preparation machine according to claim 1, wherein the locking member is at least partially built-in with the connecting member.

8. The food preparation machine according to claim 1, wherein the brewing unit comprises a sealing member for preventing fluid leakage outside of the brewing unit when the at least two cavity parts are assembled and locked together.

9. The food preparation machine according to claim 8, wherein the sealing member comprises an O-ring located at an interface between the at least two cavity parts of the brewing unit.

10. The food preparation machine according to claim 1, wherein the connecting member comprises a cone-shaped bore of the brewing unit and a flexible hosepipe of the base, an outside diameter of the flexible hosepipe is comprised between a greater and smaller inner diameter of the cone-shaped bore such that the tip of the flexible hosepipe can be fitted and pressed into the cone-shaped bore in a manner to prevent leaking.

11. The food preparation machine according to claim 1, wherein the connecting member comprises a fluid connection between the base and the brewing unit, as well as a data connection between the base and the brewing unit.

12. The food preparation machine according to claim 1, wherein the brewing unit is water and detergent resistant, washable in a dishwasher at a temperature comprised between 15° C. and 85° C., and is made of a material selected from the group consisting of: polyethylene, polypropylene, polystyrene, polycarbonate, metal, alloy, natural or synthetic rubber, and combinations thereof.

* * * * *